United States Patent [19]

Stewart et al.

[11] Patent Number: 5,082,404
[45] Date of Patent: Jan. 21, 1992

[54] VEHICLE CARGO CLAMP

[76] Inventors: Peter V. Stewart, 204 Washington Grove La., Gaithersburg, Md. 20877; David R. Butts, 6916 Tennyson Ter., Rockville, Md. 20850

[21] Appl. No.: 546,263

[22] Filed: Jun. 29, 1990

[51] Int. Cl.⁵ ............................................. B60P 7/06
[52] U.S. Cl. ............................ 410/127; 294/85; 224/325; 410/130; 410/126; 410/150
[58] Field of Search ............... 410/121, 127, 128, 130, 410/143, 144, 145, 146, 147, 148, 149, 150, 153, 34, 152, 126; 224/311, 321, 323, 325; 294/85, 103.1

[56] References Cited

U.S. PATENT DOCUMENTS

| | | | |
|---|---|---|---|
| 2,575,751 | 11/1951 | Donnelley | 410/149 |
| 2,652,004 | 9/1953 | Stough | 410/145 |
| 2,764,105 | 9/1956 | Stiegel | 410/121 |
| 2,961,269 | 11/1960 | Renfroe | 294/85 |
| 2,961,270 | 11/1960 | Renfroe | 294/85 |
| 2,973,934 | 3/1961 | Foster | 410/151 |
| 2,976,823 | 3/1961 | Dodge | 410/153 |
| 3,084,893 | 4/1963 | Ruth | 294/85 X |
| 3,186,055 | 6/1965 | Modrey | 294/85 X |
| 3,327,376 | 6/1967 | Freeman et al. | 294/85 |
| 3,554,416 | 1/1971 | Bott | 224/42.1 |
| 3,567,169 | 3/1971 | Frederick et al. | 294/85 X |
| 3,632,152 | 1/1972 | Renfroe | 294/85 |
| 4,256,425 | 3/1981 | Burgess et al. | 410/149 |
| 4,417,361 | 11/1983 | Smith | 294/103.1 X |
| 4,439,076 | 3/1984 | Loomis et al. | 410/153 |
| 4,502,619 | 3/1985 | Cox | 224/311 |
| 4,650,383 | 3/1987 | Hoff | 410/150 |
| 4,770,579 | 9/1988 | Aksamit | 410/150 |

FOREIGN PATENT DOCUMENTS

| | | | |
|---|---|---|---|
| 479098 | 12/1951 | Canada | 410/150 |
| 524680 | 5/1956 | Canada | 410/145 |
| 258193 | 3/1988 | European Pat. Off. | 410/150 |
| 1397075 | 6/1975 | United Kingdom | 294/85 |

*Primary Examiner*—Robert J. Spar
*Assistant Examiner*—Robert S. Katz
*Attorney, Agent, or Firm*—A. Fred Starobin

[57] ABSTRACT

A cargo clamp for a van, the van having cargo space defined by a floor, upwardly extending sidewalls and a roof. The cargo clamp comprises a transverse track that extends between the sidewalls below the roof and is supported below the roof and is held in place by side rails on each side. A clamp is attached to the track and is movable along the side rails between the sidewalls. The clamp also includes a downwardly extending brace that engages and restrains sheet material that is positioned on edge in the cargo space. The clamp includes a handle and bolt for engagement in a threaded hole for securing the clamp to the track at a selected position.

8 Claims, 2 Drawing Sheets

U.S. Patent    Jan. 21, 1992    Sheet 1 of 2    5,082,404
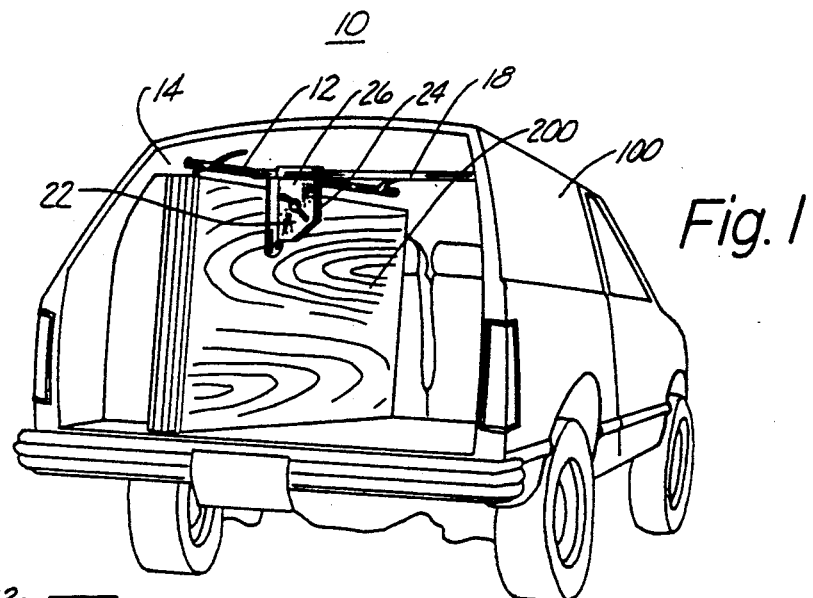
Fig. 1
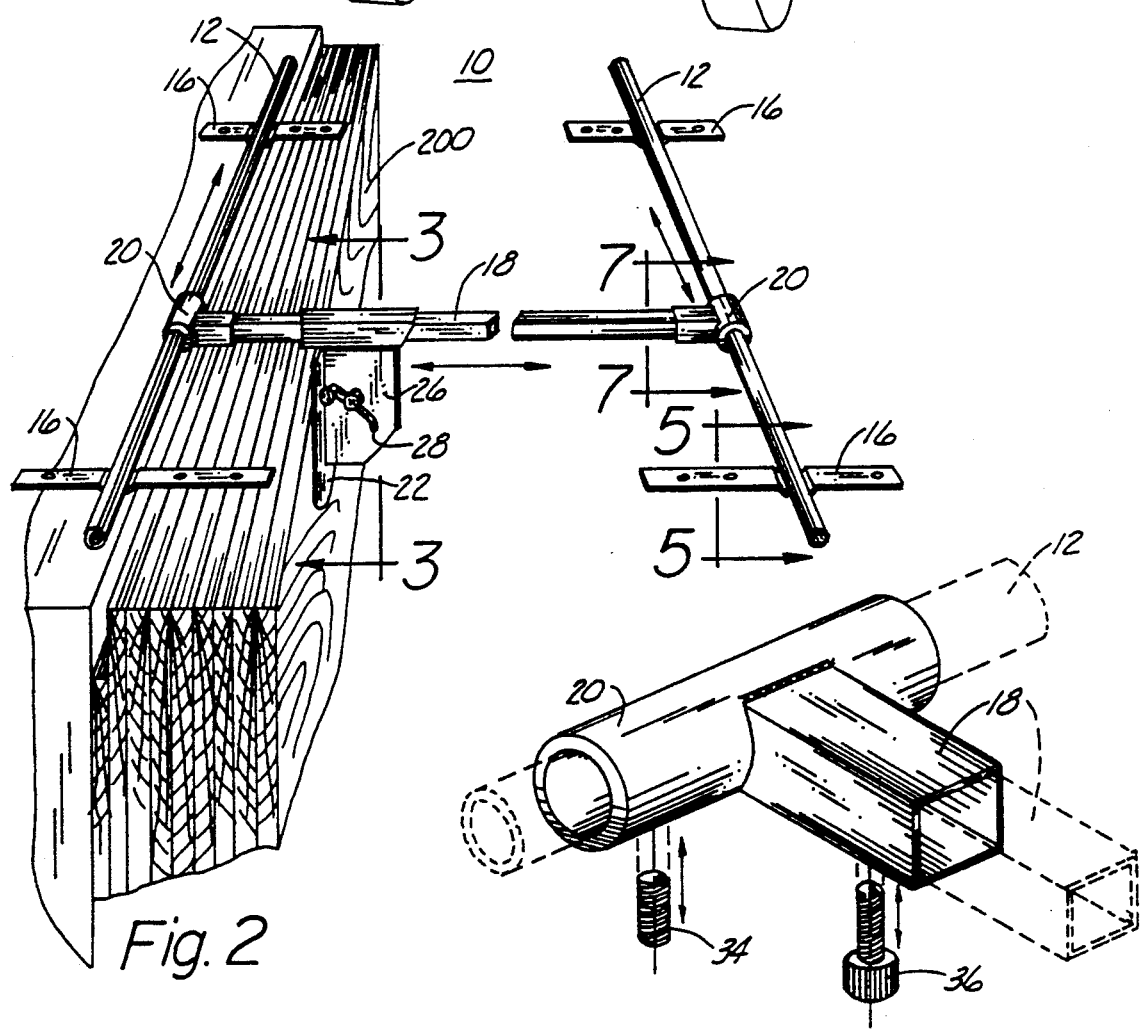
Fig. 2
Fig. 9

VEHICLE CARGO CLAMP

TECHNICAL FIELD

This invention relates to cargo securing devices for vehicles, and more particularly to a clamp that allows for transport of sheet material on edge.

BACKGROUND ART

There are many devices known for securing cargo either within or on top of a vehicle. The problems associated with top mounted cargo carriers are they are very difficult to load, especially if the cargo is large and cumbersome. Usually it takes more than one individual to load and unload a top carrier when the cargo is large. Also the weather plays an important part in deciding whether to utilize a top mounted carrier. Rain and wind can damage the load, as well as unsecuring it and making it difficult to steer the vehicle in high wind. When using a van or the like for carrying large and cumbersome materials, such as sheet material, if there is equipment already loaded in the interior of the van, the contents must first be removed to aid in loading the cargo, then one must again reload the contents. All of the above mentioned problems require additional time and manpower for loading and unloading cargo.

Those concerned with these and other problems recognize the need for an improved van cargo clamp.

DISCLOSURE OF THE INVENTION

The present invention provides a cargo clamp for a van, the van having cargo space defined by a floor, upwardly extending sidewalls and a roof. The cargo clamp comprises a transverse track that extends between the sidewalls below the roof and is supported below the roof and is held in place by side rails on each side. A clamp is attached to the track and is movable along the side rails between the sidewalls. The clamp also includes a downwardly extending brace that engages and restrains sheet material that is positioned on edge in the cargo space. The clamp includes means for securing the clamp to the track at a selected position.

An object of the present invention is the provision of an improved cargo clamp.

Another object is to provide a cargo clamp that allows for transport of sheet material on edge.

A further object of the invention is the provision of a cargo clamp that allows for transport of sheet material on edge without first having to unload contents of a vehicle in the cargo area.

Still another object is to provide a cargo clamp that is simple to use.

A still further object of the present invention is the provision of a cargo clamp that allows for safely transporting sheet material on edge, while being firmly held in place.

A still further objective is the provision that the clamp, when not in use, can be removed from the track and be stored out of the way.

A still further objective is that because of the design of the mounting bracket, the clamp can be installed in any make van.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the cargo clamp of the present invention showing its attachment in the interior of a van with sheet material being disposed on edge and clamped in place by the clamp;

FIG. 2 is a cut away partial perspective view of the present invention showing the mounting straps and transverse track, side rails and the clamp holding sheet material in place;

FIG. 9 is an exploded perspective view of the T bracket showing the bolt and set screw for securing the T bracket in a stationary position.

BEST MODE FOR CARRYING OUT THE INVENTION

Figure 3:
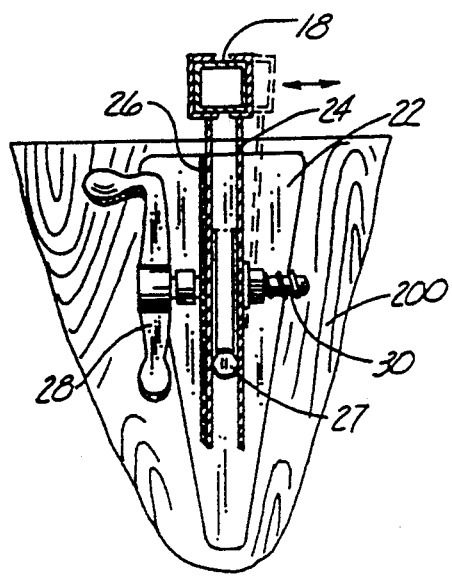
FIG. 3 is an end sectional view taken along line 3—3 of FIG. 2 showing the pivotal attachment of the side plates and the drawing mechanism that controls the relative position sof the upper sections of the side plates.

Referring now to the drawings, wherein like reference numerals designate identical or corresponding parts throughout the several views, FIG. 1 shows the cargo clamp (10) installed in the interior of a van (100). As best shown in FIG. 2, the cargo clamp (10) includes side rails (12) secured to struts (13) of the roof (14) of a van (100). Side rails (12) are secured to the roof (14) at each end by straps (16). Straps (16) are pre-drilled and held in place by fasteners well known in the art. A transverse track (18) extends between the side rails (12) and is held in place by T brackets (20). Each of the T brackets (20) slidably engage the respective side rail (12). Bolts (36) and set screws (34) secure the side rails (12) in the straps (16), and secure the T brackets (20) to the track (18) and the side rails (12).

Figure 4:
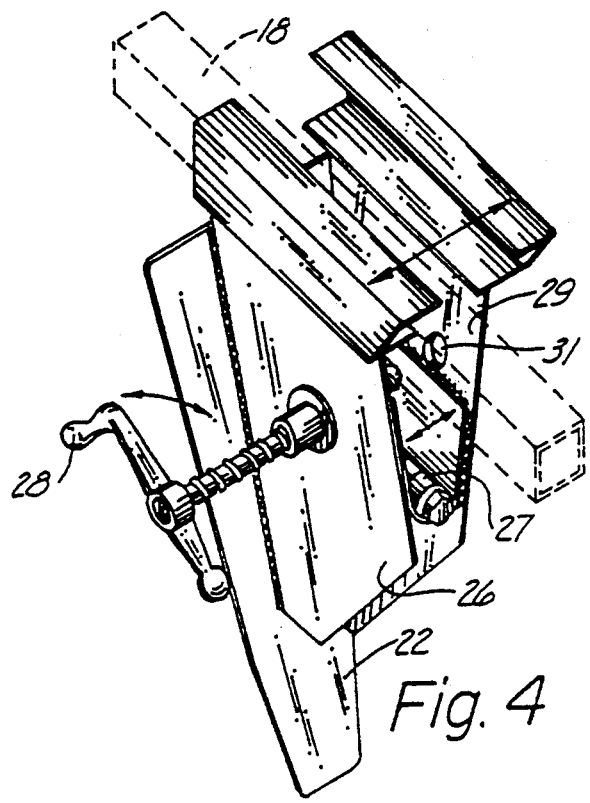
FIG. 4 is a perspective view of the clamp attached, the transverse track being shown in dashed line.
Figure 5:
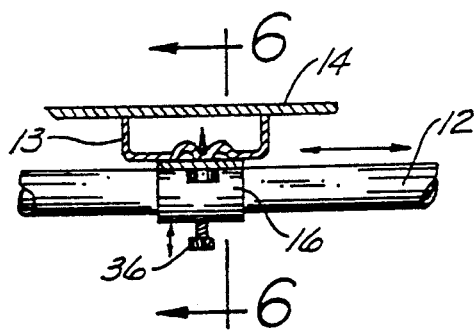
FIG. 5 is a side elevational view taken along line 5—5 of FIG. 2 showing the mounting strap in place securing one end of a side rail to a strut supporting the van roof.
Figure 6:
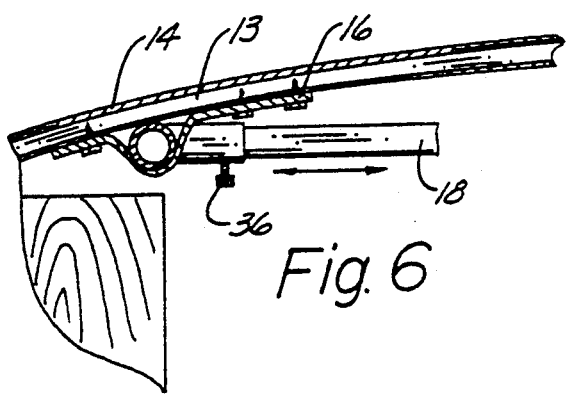
FIG. 6 is an end elevational view taken along line 6—6 of FIG. 5 showing the mounting strap attachment to the roof strut of a van.
Figure 7:
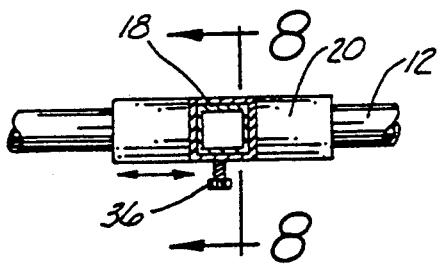
FIG. 7 is a side elevational view taken along line 7—7 of FIG. 2 showing the T bracket attachment of the present invention slidingly engaged on the side rail.
Figure 8:
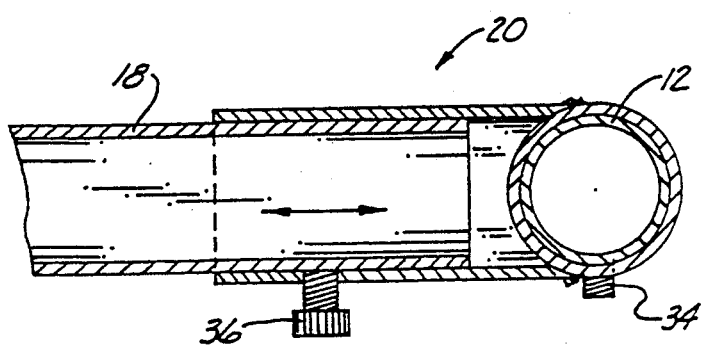
FIG. 8 is an end sectional view taken along line 8—8 of FIG. 7 showing the attachment of the T bracket to interconnect the transverse track and one of the side rails.

Referring now to FIGS. 2, 3 and 4, the cargo clamp (10) further includes a cargo brace (22) for holding sheet material (200) on edge during transport. Attached to the cargo brace (22) is a first side plate (26) which is rigidly attached to the cargo brace (22) and the upper section thereof slidingly engages track (18). A second side plate (24) is pivotally attached to the first side plate (26) by a hinge (27). The upper section of the second side plate (24) slidingly engages track (18) as well. A handle (28) is attached to threaded bolt (30) which engages a threaded opening (32) in the second side plate (24) to selectively draw the upper sections of the side plates (24, 26) together to secure the clamp against movement with respect to the track (18).

In use, handle (28) is turned counter-clockwise to draw bolt (30) from threaded opening (32) in side plate (24) and allow the upper sections of the side plates (24, 26) to open as illustrated in the dashed line showing of FIG. 3. The clamp is then moved to one side of the van (100) along track (18) to allow for loading of sheet material (200). Sheet material (200) is loaded into the cargo area of van (100). After loading sheet material (200), the T brackets (20) and the attached track (18) are slid along side rails (12) to properly place the cargo brace (22) in position. The cargo brace (22) is then slid along the track (18) until it is positioned snugly up against material (200). The handle (28) is turned clockwise and bolt (30) engages the threaded hole (32) in the side plate (24) to draw the upper sections of the side plates together to securely hold the clamp against movement along track (18).

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

We claim:

1. A cargo clamp for securing a load in a van having a cargo space defined by a floor, upwardly extending sidewalls, and a roof extending between and interconnecting the upper portions of the sidewalls, with a transverse track disposed to extend between the sidewalls below the roof and means for supporting the transverse track below the roof, said cargo clamp comprising
    a clamp attached to the track and being selectively movable along the track between the sidewalls, said clamp including
        a downwardly extending cargo brace disposed to engage and restrain sheet material positioned on edge in the cargo space;
        means for securing said clamp against movement with respect to the track at a selected position including
            a first side plate rigidly attached to said cargo brace, said first side plate including a first upper section disposed to engage a first portion of the track,
            a second side plate pivotally attached to said first side plate, said second side plate including a second upper section disposed to engage a second portion of the track,
            and means for drawing said first upper section toward said second upper section, said drawing means including
                a threaded bolt disposed to extend through an opening in said first side plate and engage a threaded opening in said second side plate,
                and a handle attached to said bolt adjacent said first side plate.

2. A cargo securing system for a vehicle having a pair of opposite walls, said system comprising:
    a track which extends between said pair of opposite walls, and
    a clamping device attachable to and selectively slidably movable along said track for securing cargo, said clamping device comprising:
        (a) a first side plate having an opening therethrough,
        (b) a second side plate having an opening therethrough substantially aligned with said opening in said first side plate,
        (c) a cargo brace member secured to at least one of said side plates for contacting said cargo and preventing the movement thereof,
        (d) a hinge means integrally connected to said first side plate and to said second side plate for pivotally attaching said first side plate to said second side plate for pivotal motion between a open position wherein said clamping device may be selectively slid along said track and a closed position wherein said first and second plates clamp said track to prevent said clamping device from moving with respect to said track,
        (e) means for providing said pivotal motion extending through said openings in said plates, whereby moving said means for providing said pivotal motion causes said plates to move between said open and closed positions, and
        (f) means attached to said means for providing said pivotal motion to facilitate the moving of said means for providing said pivotal motion.

3. The system of claim 2 wherein
said means for providing said pivotal motion includes a threaded bolt.

4. The system of claim 3 wherein
said means to facilitate the motion of said means for providing said pivotal motion includes a handle attached at one end of said threaded bolt.

5. The system of claim 2 further comprising,
supporting means for supporting said track, and
connection means for allowing said track to move with respect to said supporting means in a direction substantially perpendicular to said track and substantially parallel to said pair of opposite walls.

6. The system of claim 5 wherein
said supporting means includes a pair of side rails supported by straps near their ends.

7. The system of claim 5 wherein
said connection means includes a T-bracket connected at each end of said track and having a tubular portion fitted around said respective side rail for movement along said supporting means and a portion extending from said tubular portion for connection to said track.

8. The system of claim 6 wherein
said connection means includes a T-bracket connected at each end of said track and having a tubular portion fitted around said respective side rail for movement along said supporting means and a portion extending from said tubular portion for connection to said track.

* * * * *